Figure 1:
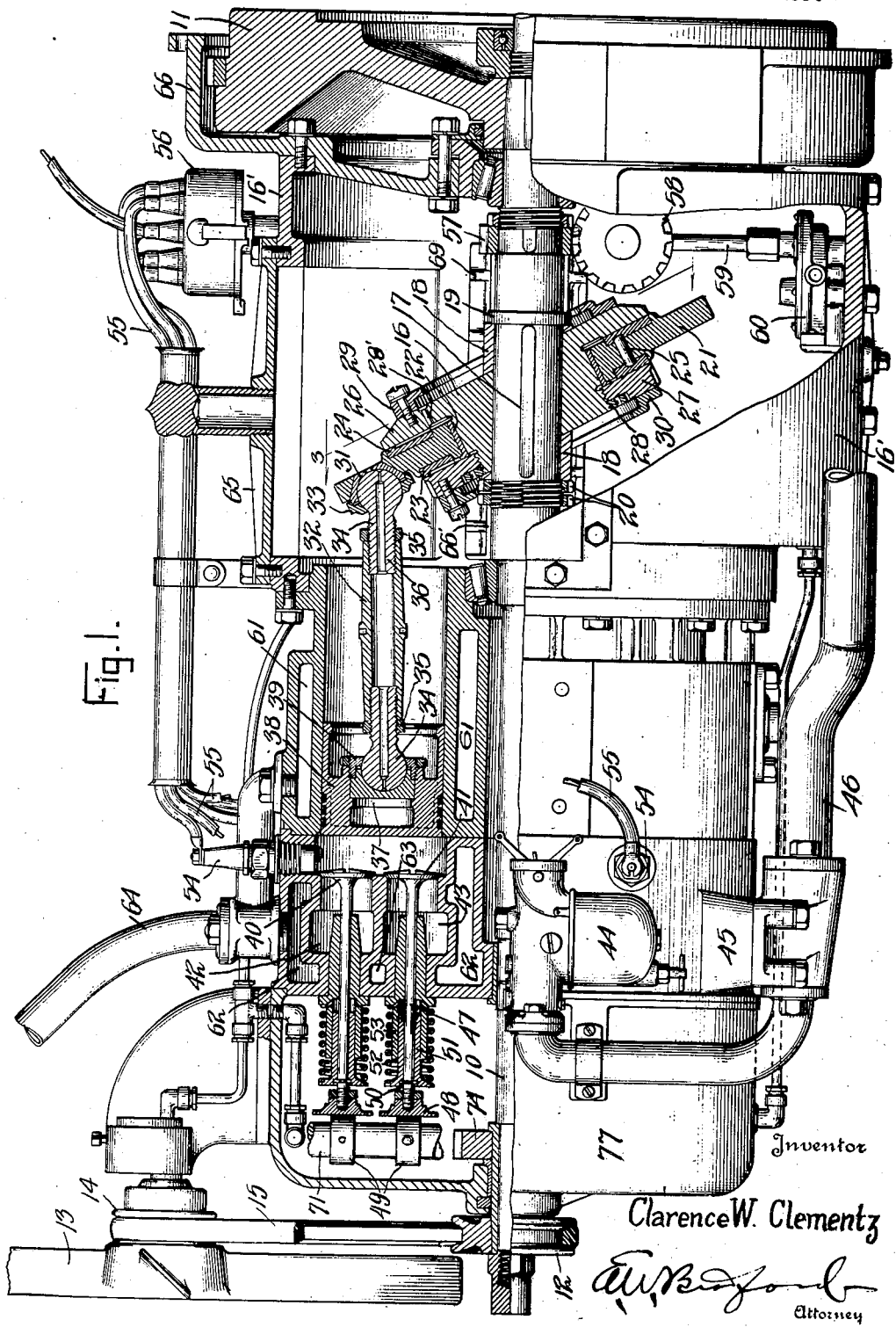

Jan. 8, 1924.

C. W. CLEMENTZ 1,480,506

CRANKLESS ENGINE

Filed Aug. 17, 1922

2 Sheets-Sheet 1

Inventor

Clarence W. Clementz

Attorney

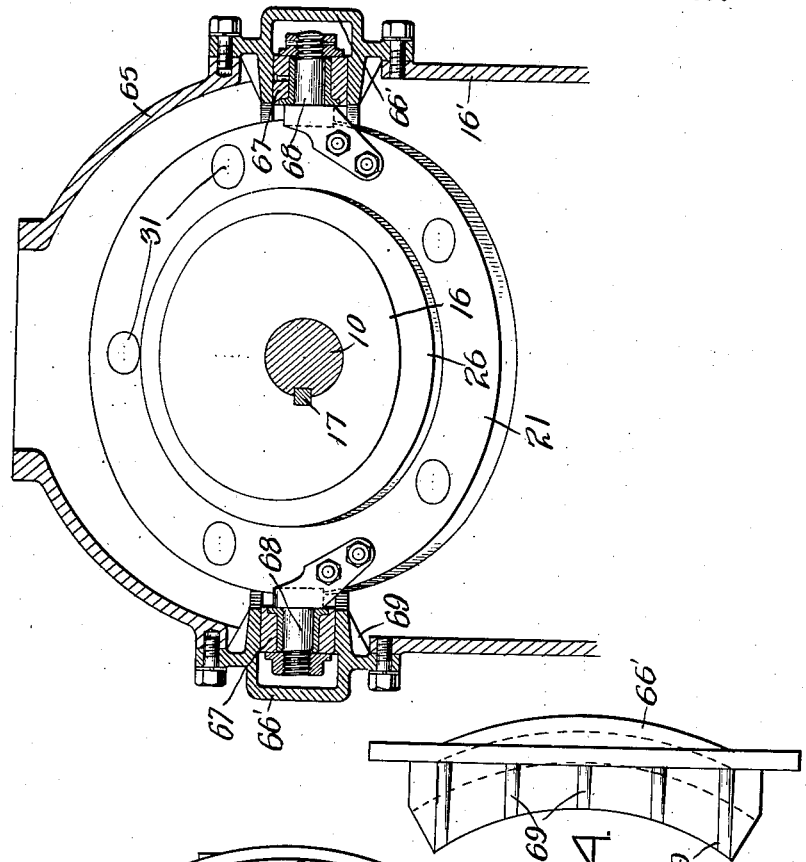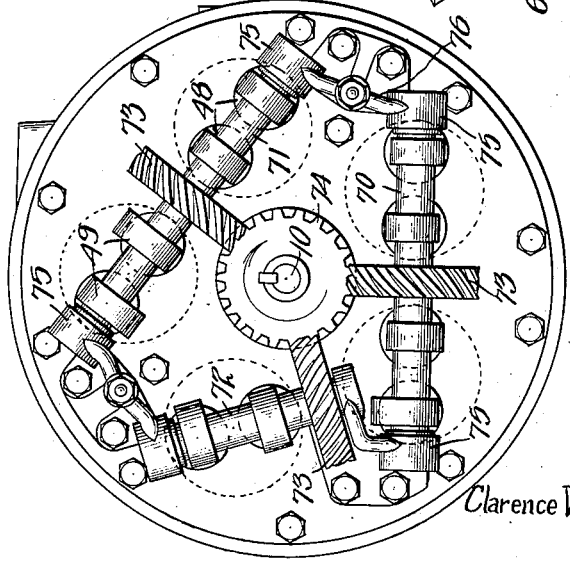

Patented Jan. 8, 1924.

1,480,506

UNITED STATES PATENT OFFICE.

CLARENCE W. CLEMENTZ, OF JACKSONVILLE, FLORIDA, ASSIGNOR TO CRANKLESS ENGINE COMPANY, OF JACKSONVILLE, FLORIDA, A CORPORATION OF FLORIDA.

CRANKLESS ENGINE.

Application filed August 17, 1922. Serial No. 582,568.

*To all whom it may concern:*

Be it known that I, CLARENCE W. CLEMENTZ, a citizen of the United States, residing at Jacksonville, in the county of Duval and State of Florida, have invented certain new and useful Improvements in Crankless Engines, of which the following is a specification.

My said invention relates to a crankless engine of the internal combustion type and it is an object of the invention to provide a simple and efficient engine in compact form.

Another object of the invention is to provide an engine in which all the working parts will be readily accessible.

A further object is to provide improved valve operating means.

Referring to the accompanying drawings which are made a part hereof and on which similar reference characters indicate similar parts, Figure 1 is a side elevation of my improved device with parts broken away to show the internal construction, Figure 2 a section showing the valve controlling means, Figure 3 a section on line 3—3 of Figure 1, and Figure 4 a plan of a bearing bracket shown in Figure 3.

In the drawings reference character 10 indicates a main shaft carrying at one end a fly wheel 11 and at the other end a pulley 12 for driving a fan 13 by means of a pulley 14 and a belt 15 connecting the two pulleys. At an intermediate point on the shaft an oblique disk 16 is secured thereto, the disk being held against rotation by spline 17 and being held against longitudinal movement on the shaft by means of oblique washers 18, one of which abuts against a flange 19 fixed to the shaft and the other against nuts 20 threaded on the shaft. The oblique disk is located in an open space formed by a casing section 16' which contains enough oil to lubricate certain parts of the engine by a "splash" system. The disk has an annular seat 14 for a ring 21 spaced from the disk by a bushing 22 and having at its sides annular plates 23 and 24 of bronze or other bearing metal held against rotation relative to the ring by a pin 25. The bearing plate 24 separates the ring from a flange 26 of the oblique disk and the bearing plate 23 separates the ring from a separable flange 27 threaded on the disk and held in place by locking ring or lock nut 28. The flange 26 has an oil passage at 28' to provide for lubricating the contacting faces of flange 26 and plate 24 and oil is brought to this passage by a flanged ring 29 secured to the outer face of the disk and forming part of a splash system of lubrication in this section of the engine casing. A similar flanged ring 30 is secured to the base of the nut 27 for a similar purpose. Other anti-friction bearings; e. g., roller bearings, may be substituted for the plates 23 and 24, if preferred.

The part of the ring 21 extending beyond the flanges of the disk is provided with bearings 31 in which are seated the ends of connecting rods 32, these being held in place by nuts 33 threaded on bearings 31. The connecting rods correspond to the number of pistons and are hollow for lubrication of their bearings, the body of the piston carrying at each end a head 34 adjustably connected to the body and held in adjusted position by a lock nut 35. A passage 36 through each of the heads connects with the hollow portion of the body member of the connecting rod and opens at one end through a bearing 31 into the open space in casing 16' about the oblique disk and wabbler and at the other end to a bearing in the piston. At this end the head of the connecting rod rests against a bearing member 37 in the piston 38, being held in place by a threaded bearing member at 39.

In the present embodiment of the invention the cylinders are shown as five in number though this number may be varied within the scope of my invention. Each cylinder has at its forward end an inlet valve 40 and an outlet valve 41. the inlet valve closing a passage from a fuel space 42 and the outlet valve closing a passage into an exhaust space 43. A carbureter 44 provides a mixture of liquid fuel for the fuel space and an exhaust passage 45 provides a means for escape of gases from the exhaust space 43. It will be noted that the exhaust passage extends around the air intake conduit 46 of the carbureter thereby providing means for imparting heat to the incoming air.

Referring to the specific structure of the valves each of them has a stem 47 and a foot 48 for engagement by a tappet 49. At an intermediate point a nut or flange 50 is located on the stem and a sleeve 51 bears against the same, the sleeve at its outer end being expanded and a spring 52 bearing at one end against the expanded portion and at the other end against a flange on a sleeve 53 surrounding the stem 47 and also surrounding the inner part of the sleeve 51.

The spark plugs 54 project through the shell into the cylinders between the heads of the valves and the corresponding pistons, and immediately adjacent the fuel openings. These spark plugs are connected by insulated wires 55 to a timer 56 which is geared to the main shaft at 57. The gear 57 also serves to drive a gear 58 which through a shaft 59 drives a pump 60 providing forced lubrication for the fly wheel and certain parts of the engine.

The engine is water cooled throughout the annular spaces constituting the water jacket indicated at 61, 61′, 62, 62′ and 63 and the pipe leading to the radiator is indicated at 64. Access is had to the space within the main casing 16′ by means of a circular cover 65. This casing is closed at one end by the fly wheel casing 66. The cover can readily be detached and affords a convenient access to the parts mentioned and to the pistons and piston rods. The shell of the engine also includes hollow supporting housings 66′ for the bearings of the ring 21 which, as is well understood in devices of this character, has an all around oscillating or a wabbling movement but does not rotate upon its axis. These housings, as will be evident from consideration of Figures 3 and 4, have elongated internal bearing surfaces for a pair of slide bearings 67 in which the pivots 68 of the ring are journaled. At the inner side of the casing the brackets are re-enforced by a number of ribs 69.

The usefulness of these removable housings in which the bearings 67 slide longitudinally of the casing as the wabbler moves will be readily appreciated since it enables the bearings and their bushings as well as the pivot pins themselves to be removed for repair or replacement by merely taking off the corresponding housing.

Arrangement of the valve gearing will be clearly understood from Figure 2 which shows three tappet shafts 70, 71, and 72 of which each one of the first two carry tappets for actuating the valves of two cylinders and the third has tappets for actuating the valves of a single cylinder. The shafts are driven by oblique gears 73 meshing with a similar gear 74 on the main shaft 10. The shafts are provided with bearings 75 at their ends held in place by clamps 76.

It will be obvious to those skilled in the art that many changes may be made in my device without departing from the spirit of the invention the true scope of which is indicated in the appended claims. It will also be evident that the parts thereof are all readily accessible by removal of the lid 65 or the head 77 enclosing the valve gearing. The entire device takes up comparatively little room and is therefore well fitted for use in automobiles where the machine must usually be made longer than otherwise necessary because of the bulky character and peculiar shape of the engine.

Having thus fully described my said invention, what I claim as new and desire to secure by Letters Patent, is:

1. An internal combustion engine comprising a main shaft, an oblique disk fixed to the shaft, a wabbler on the disk, a series of cylinders located about the shaft, pistons in the cylinders connected to the wabbler, an exhaust space surrounding the shaft, a fuel space concentric with the exhaust space, passages leading from said spaces to each cylinder, and sets of valves arranged in concentric series for opening and closing said passages, substantially as set forth.

2. In an internal combustion engine, a main shaft, an odd number of cylinders surrounding it, pistons in said cylinders, inlet and outlet valves at the upper end of the cylinders, cam shafts located about the main shaft, one of said shafts having a single pair of cams for operating the valves of a single cylinder and the remaining shafts each provided with cams for actuating the valves of a pair of cylinders, substantially as set forth.

3. An internal combustion engine comprising an outer casing, a main shaft therein, an oblique disk on the shaft, a wabbler journaled on the disk, pivots at opposite sides of the wabbler, removable housings externally secured to the casing, and bearings for the pivots slidably mounted in their respective housing for movement longitudinally of the casing, substantially as set forth.

4. A crankless engine having a main shaft, a set of cylinders arranged in a circle concentric with said shaft, inlet and outlet valves in sets also concentric with said shaft, cam shafts extending transversely of the main shaft bearing pairs of cams each pair operating the inlet and outlet valves of a cylinder, and gearing for driving the cam shafts from the main shaft, substantially as set forth.

In witness whereof, I have hereunto set my hand and seal at Jacksonville, Florida, this 12th day of August, A. D. nineteen hundred and twenty-two.

CLARENCE W. CLEMENTZ. [L. S.]

Witnesses:
    J. L. Doss, Jr.,
    Gladys Cox.